United States Patent
Angell et al.

(10) Patent No.: US 10,490,847 B2
(45) Date of Patent: Nov. 26, 2019

(54) ALKALI ION CONDUCTING PLASTIC CRYSTALS

(71) Applicants: C. Austen Angell, Mesa, AZ (US); Iolanda Santana Klein, Tempe, AZ (US); Telpriore Greg Tucker, Phoenix, AZ (US)

(72) Inventors: C. Austen Angell, Mesa, AZ (US); Iolanda Santana Klein, Tempe, AZ (US); Telpriore Greg Tucker, Phoenix, AZ (US)

(73) Assignee: Arizona Board of Regents, a Body Corporate of the State of Arizona Acting for and on Behalf of Arizona State University, Scottsdale, AZ (US)

( * ) Notice: Subject to any disclaimer, the term of this patent is extended or adjusted under 35 U.S.C. 154(b) by 630 days.

(21) Appl. No.: 14/775,215

(22) PCT Filed: Mar. 14, 2014

(86) PCT No.: PCT/US2014/029294
§ 371 (c)(1),
(2) Date: Sep. 11, 2015

(87) PCT Pub. No.: WO2014/153146
PCT Pub. Date: Sep. 25, 2014

(65) Prior Publication Data
US 2016/0043431 A1 Feb. 11, 2016

Related U.S. Application Data

(60) Provisional application No. 61/782,292, filed on Mar. 14, 2013.

(51) Int. Cl.
*H01M 10/056* (2010.01)
*H01M 10/0562* (2010.01)
(Continued)

(52) U.S. Cl.
CPC ... *H01M 10/0562* (2013.01); *H01M 10/0525* (2013.01); *H01M 10/056* (2013.01);
(Continued)

(58) Field of Classification Search
CPC ........... H01M 10/056; H01M 10/0561; H01M 10/0562
See application file for complete search history.

(56) References Cited

U.S. PATENT DOCUMENTS 3,459,500 A   8/1969 Segura et al.
4,042,482 A * 8/1977 Shannon ............... C01B 33/20
                                                    204/242
(Continued)

FOREIGN PATENT DOCUMENTS

CA    2435218 A1   7/2005
WO    2014153146 A1   9/2014

OTHER PUBLICATIONS

Cooper et al. (1986). "Ambient Temperature Plastic Crystal Fast Ion Conductors," Solid State Ionics 18 & 19, 570-576.
(Continued)

*Primary Examiner* — Jeremiah R Smith
(74) *Attorney, Agent, or Firm* — Fish & Richardson P.C.

(57) ABSTRACT

Inorganic plastic crystal electrolytes, also referred to herein as inorganic plastic crystal conductors or single ion conductors including $[AB_{x-y}C_y]^{p-}[M]_y^+$, where A is a tetravalent to hexavalent atom; B is a monovalent ligand; C is an oxyanion; M is an alkali metal; x is 4 when A is tetravalent, x is 5 when A is pentavalent, and x is 6 when A is hexavalent; y is an integer from 1 to x−1 inclusive. $[AB_{x-y}Cy]^{p-}[M]_y^+$ is rotationally disordered and ionically conductive.

7 Claims, 10 Drawing Sheets

(51) Int. Cl.
*H01M 10/0525* (2010.01)
*H01M 10/0561* (2010.01)

(52) U.S. Cl.
CPC .................................................................... *H01M 10/0561* (2013.01); *H01M 2300/0071* (2013.01); *H01M 2300/0091* (2013.01)

(56) References Cited

U.S. PATENT DOCUMENTS

| | | | | |
|---|---|---|---|---|
| 5,484,670 | A * | 1/1996 | Angell | H01M 6/14 |
| | | | | 429/188 |
| 6,136,472 | A * | 10/2000 | Barker | C01B 25/45 |
| | | | | 429/218.1 |
| 6,475,561 | B1 | 11/2002 | Schwertfeger et al. | |
| 6,913,855 | B2 | 7/2005 | Stoker et al. | |
| 6,955,867 | B1 | 10/2005 | Otsuki | |
| 8,338,038 | B2 | 12/2012 | Coors et al. | |
| 8,784,512 | B2 * | 7/2014 | Wadley | H01M 6/40 |
| | | | | 29/623.5 |
| 2003/0008190 | A1 * | 1/2003 | Chisholm | B01D 53/228 |
| | | | | 429/491 |
| 2004/0053134 | A1 * | 3/2004 | Ozaki | H01M 4/04 |
| | | | | 429/231.1 |
| 2004/0241553 | A1 * | 12/2004 | Abe | H01B 1/122 |
| | | | | 429/337 |
| 2005/0095482 | A1 * | 5/2005 | Garner | C04B 35/486 |
| | | | | 429/482 |
| 2007/0003836 | A1 | 1/2007 | Suzuki | |
| 2011/0008677 | A1 * | 1/2011 | Nakane | H01M 4/131 |
| | | | | 429/218.1 |
| 2011/0171528 | A1 * | 7/2011 | Oladeji | C23C 18/06 |
| | | | | 429/223 |
| 2012/0107690 | A1 | 5/2012 | Wakizaka | |
| 2013/0209893 | A1 * | 8/2013 | Archer | H01M 10/052 |
| | | | | 429/317 |
| 2019/0020060 | A1 | 1/2019 | Angell | |

OTHER PUBLICATIONS

MacFarlane et al. (Dec. 1999). "Lithium-doped plastic crystal electrolytes exhibiting fast ion conduction for secondary batteries," Nature 402, 792-794.
Alarco et al. (2004). "The plastic-crystalline phase of succinonitrile as a universal matrix for solid-state ionic conductors," Nature Materials 3, 476-481.
Hayashi et al. (May 2012). "Superionic glass-ceramic electrolytes for room-temperature rechargeable sodium batteries," Nature Communications 3, 856.
Nishijima et al. (Jan. 2009). "Cathode properties of metal trifluorides in Li and Na secondary batteries," J. Power Sources 190, 558-562.
Park et al. (2007). "Discharge properties of all-solid sodium-sulfur battery using poly (ethylene oxide) electrolyte," J. Power Sources 165, 450-454.
Lu et al. (2010). "Advanced materials for sodium-beta alumina batteries: Status, challenges and perspectives," J. Power Sources 195, 2431-2442.
Mizuno et al. (Apr. 2005). "New, highly ion-conductive crystals precipitated from Li2S—P2S5 Glasses," Adv. Mater. 17, No. 7, 918-921.
Sakuda et al. (2010). "Interfacial Observation between LiCoO2 Electrode and Li2S—P2S5 Solid Electrolytes of All-Solid-State Lithium Secondary Batteries Using Transmission Electron Microscopy," Chem. Mater 22, 949-956.
Long et al. (2003). "Fast ion conduction in olecular plastic crystals," Solid State Ionics 161, 105-112.
Derollez et al. (1990). "Structure of succinonitrile in its plastic phase," J. Phys. Condens. Matter 2, 6893-6903.
Volel et al. (2004). "Morphology and Nanomechanics of Conducting Plastic Crystals," Chem. Phys. Chem. 5, 1027-1033.
Nan et al. (Dec. 2003). "Enhanced Ionic Conductivity of Polymer Electrolytes Containing Nanocomposite SiO2 Particles," Phys. Rev. Lett. 91, No. 26, 104-108.
Bhattacharyya et al. (2004). "Second Phase Effects on the conductivity of Non-Aqueous Salt Solutions: "Soggy Sand Electrolytes"," Adv. Mater. 16, Nos. 9-10, 811-814.
Itoh et al. (2003). "Composite polymer electrolytes of poly(ethylene oxide)/BaTiO3/Li salt with hyperbranched polymer," J. Power Sources 119-121, 403-408.
Rey et al. (1998). "Infrared and Raman study of the PEO-LiTFSI polymer electrolyte," Electrochim. 43, Nos. 10-1, 1505-1510.
Gorecki et al. (2002). "NMR and Conductivity Study of Polymer Electrolytes in the Imide Family: P(EO)/Li[N(SO2CnF2n 1)(SO2CmF2m 1)]," Chem. Phys. Chem. 3, No. 7, 620-625.
Saboungi et al. (2000). "Sturucture of Liquid PEO-LiTFSI Electrolyte," Phys. Rev. Lett. 84, No. 24, 5536-5539.
Linert et al. (2002). "Anions of low Lewis basicity for ionic solid state electrolytes," Coord. Chem. Rev. 226, 137-141.
Tarascon et al. (1994). "New electrolyte compositions stable over the 0 to 5 V voltage range and compatible with the Lil+xMn2O4/carbon Li-ion cells," Solid State Ionics 69, 293-305.
Lee et al. (2012) "Lithium salt solutions in mixed sulfone and sulfone-carbonate solvents, and a Walden plot analysis of the maximally conductive solutions," J. Phys. Chem. 116, 23915-23920.
Seki et al. (2006) "Lithium Secondary Batteries Using Modified-Imidazolium Room-Temperature Ionic Liquid," J. Phys. Chem. B 110, 10228-10230.
Sakaebe et al. (2003) "N-Methyl-N-propylpiperidinium bis(trifluoromethanesulfonyl)imide (PP13-TFSI)—novel electrolyte base for Li battery," Electrochem. Commun. 5, 594-598.
Cooper et al. (1983) "Versatile Organic Iodide Melts and Glasses with High Mole Fractions of Lil—Glass-Transition Temperatures and Electrical Conductivities," Solid State Ionics 9-10, 617-622.
Briant et al. (1980) "Ionic conductivity in Na+, K+, and Ag+ β"-alumina," J. Solid State Chem. 33, 385-390.
Kamaya et al. (Jul. 2011) "A lithium superionic conductor," Nature Materials 10, 682-686.
Hayashi et al. (2004) "Characterization of Li2S—P2S5 glass-ceramics as a solid electrolyte for lithium secondary batteries," Solid State Ionics 175, 683-686.
Hayashi et al. (2010) "Development of sulfide glass-ceramic electrolytes for all-solid-state lithium rechargeable batteries," J. Solid State Electrochem. 14, 1761-1767.
Bauer et al. (2010) "Relaxation dynamics and ionic conductivity in a fragile plastic crystal," J. Chem. Phys. 135, 144509.
Kim et al. (Jul. 2006) "Anomalous Ionic Conductivity Increase in Li2S+GeS2+GeO2 Glasses," J. Phys. Chem. 110, 16318-16325.
Authorized Officer Kihwan Moon, International Preliminary Report on Patentability for PCT/US2014/029294, dated Sep. 24, 2015, 10 pages.
Authorized Officer Blaine R. Copenheaver, International Search Report and Written Opinion for PCT/US2014/029294, dated Jul. 29, 2014, 18 pages.
Hayamizu, K., Aihara, Y., Nakagawa, H., Nukuda, T. & Price, W. S. Ionic Conduction and Ion Diffusion in Binary Room-Temperature Ionic Liquids Composed of [emim][BF 4 ] and LiBF 4. J. Phys. Chem. B 108, 19527-19532 (2004).
Ye, H., Huang, J., Xu, J. J., Khalfan, A. & Greenbaum, S. G. Li Ion Conducting Polymer Gel Electrolytes Based on Ionic Liquid/PVDF-HFP Blends. J. Electrochem. Soc. 154, A1048 (2007).
Seino, Y., Ota, T., Takada, K., Hayashi, A. & Tatsumisago, M. A sulphide lithium super ion conductor is superior to liquid ion conductors for use in rechargeable batteries. Energy Environ. Sci. 7, 627-631 (2014).
Hayashi, A., Minami, K., Ujiie, S. & Tatsumisago, M. Preparation and ionic conductivity of Li7P3S11-z glass-ceramic electrolytes. J. Non. Cryst. Solids 356, 2670-2673 (2010).
Ansari, Y., Tucker, T. G. & Angell, C. A. A novel, easily synthesized, anhydrous derivative of phosphoric acid for use in electrolyte with phosphoric acid-based fuel cells. J. Power Sources 237, 47-51 (2013).
Evans, J., Vincent, C. A. & Bruce, P. G. Electrochemical measurement of transference numbers in polymer electrolytes. Polymer (Guildf). 28, 2324-2328 (1987).

(56) References Cited

OTHER PUBLICATIONS

Zugmann, S. et al. Measurement of transference numbers for lithium ion electrolytes via four different methods, a comparative study. Electrochim. Acta 56, 3926-3933 (2011).

Hayashi, S. & Hayamizu, K. Chemical Shift Standards in High-Resolution Solid-State NMR (1) 13C, 29Si and 1H Nuclei. Bull. Chem. Soc. Jpn. 64, 685-687 (1991).

Eaborn, C. Cleavages of aryl-silicon and related bonds by electrophiles. J. Organomet. Chem. 100, 43-57 (1975).

Bassindale, A. R. & Stout, T. The synthesis of functionalised silyltriflates. J. Organomet. Chem. 271, C1—C3 (1984).

Matyjaszewski, K. & Chen, Y. L. Synthesis and reactions of silanes containing two triflate groups. J. Organomet. Chem. 340, 7-12 (1988).

Stallworth, P. et al. NMR, DSC and high pressure electrical conductivity studies of liquid and hybrid electrolytes. J. Power Sources 81-82, 739-747 (1999).

Kim, S.-H. et al. A shape-deformable and thermally stable solid-state electrolyte based on a plastic crystal composite polymer electrolyte for flexible/safer lithium-ion batteries. J. Mater. Chem. A 2, 10854-10861 (2014).

Shekibi, Y., Midler, T., Huang, J. & Hollenkamp, A. F. Realisation of an all solid state lithium battery using solid high temperature plastic crystal electrolytes exhibiting liquid like conductivity. Phys. Chem. Chem. Phys. 14, 4597 (2012).

Fan, J. & Fedkiw, P. S. Electrochemical impedance spectra of full cells: Relation to capacity and capacity-rate of rechargeable Li cells using LiCoO2, LiMn2O4, and LiNiO2 cathodes. J. Power Sources 72, 165-173 (1998).

Haile, S. M.; Boysen, D. a; Chisholm, C. R.; Merle, R. B. Solid acids as fuel cell electrolytes. Nature 2001, 410 (6831), 910.

Haile, S. M.; Chisholm, C. R. I.; Sasaki, K.; Boysen, D. a; Uda, T. Solid acid proton conductors: from laboratory curiosities to fuel cell electrolytes. Faraday Discuss. 2007, 134, 17.

Ansari, Y.; Ueno, K.; Zhao, Z.; Angell, C. A. Anhydrous Superprotonic Polymer by Superacid Protonation of Cross-linked (PNC12)n. J. Phys. Chem. C 2013, 117, 1548.

Flowers, R. H.; Gillespie, R. J.; Robinson, E. A. The Sulphuric Acid Solvent System Part V. Solutions of Some Organosilicon Compounds. Can. J. Chem. 1963, 41 (10), 2464.

Merle, R. B.; Chisholm, C. R. I.; Boysen, D. a.; Haile, S. M. Instability of Sulfate and Selenate Solid Acids in Fuel Cell Environments. Energy and Fuels 2003, 17 (1), 210-215.

Greenwood, N. N.; Thompson, A. J. The Mechanism of Electrical Conduction in Fused Phosphoric and Trideuterophosphoric Acids. Chem. Soc. 1959, VI, 3485.

Wang, Y.; Lane, N. a.; Sun, C. N.; Fan, F.; Zawodzinski, T. A.; Sokolov, A. P. Ionic Conductivity and Glass Transition of Phosphoric Acids. J. Phys. Chem. B 2013, 117, 8003.

Baranov, A. I.; Shuvalov, L. A.; Shchagina, N. M. Superion conductivity and phase transitions in $CsHSO_4$ and $CsHSeo_4$ crystals. JETP Lett. 1982, 36 (11), 459.

Chisholm, C. R. I.; Haile, S. M. Superprotonic behavior of $Cs_2$ $(HSO_4)(H_2PO_4)$—a new solid acid in the $CsHSO_4$—$CsH_2PO_4$ system. Solid State Ionics 2000, 136, 229.

Hayes, M. J.; Pepper, D. C. The Solubility of $H_2SO_4$ in 1, 2-Dichlorethane. Trans. Faraday Soc. 1961, 57, 432.

* cited by examiner

ововgetting...

ALKALI ION CONDUCTING PLASTIC CRYSTALS

CROSS-REFERENCE TO RELATED APPLICATIONS

This application is a U.S. National Phase Application of International Patent Application No. PCT/US2014/029294 filed Mar. 14, 2014, which claims the benefit of U.S. application Ser. No. 61/782,292 entitled "INORGANIC PLASTIC CRYSTAL ELECTROLYTES" filed on Mar. 14, 2013, the contents of both of which are incorporated herein by reference in their entirety.

STATEMENT OF GOVERNMENT INTEREST

This invention was made with government support under DE-AC02-05CH11231 awarded by the Department of Energy. The government has certain rights in the invention.

FIELD OF THE INVENTION

This invention relates to inorganic plastic crystal electrolytes suitable as fast alkali ion conductors for alkali batteries and related electrochemical devices.

BACKGROUND

FIG. 1 depicts electrochemical device 100 having anode 102 and cathode 104. Anode 102 and cathode 104 are separated by separator 106. In one example, electrochemical device 100 is a lithium-ion battery (LIB). Anode 102 includes anode collector 108 and anode material 110 in contact with the anode collector. Cathode 104 includes cathode collector 112 and cathode material 114 in contact with the cathode collector. Electrolyte 116 is in contact with anode material 110 and cathode material 114. Anode collector 108 and cathode collector 112 are electrically coupled via closed external circuit 118. Anode material 110 and cathode material 114 are materials into which, and from which, alkali ions 120 can migrate. During insertion (or intercalation) alkali ions move into the electrode (anode or cathode) material. During extraction (or deintercalation), the reverse process, alkali ions move out of the electrode (anode or cathode) material. When an electrochemical device is discharging, alkali ions are extracted from the anode material and inserted into the cathode material. When the cell is charging, alkali ions are extracted from the cathode material and inserted into the anode material. The arrows in FIG. 1 depict movement of alkali ions through separator 106 during charging and discharging. FIG. 2 depicts electrochemical device 100 positioned in and configured to provide power to apparatus 200. Apparatus 200 may be, for example, a motorized vehicle.

A variety of electrolytes 116 have been used for moving alkali cations from anode to cathode compartments of electrochemical devices. In one example, $Li^+$ ions in a LIB are transported through a molecular solvent blend. The blend is used because no single solvent has been found to dissolve the preferred salt $LiPF_6$ and at the same time yield a sufficiently high ion mobility. Ion mobility can be increased by mixing a high polarity but viscous component with an equal amount of a low dielectric constant, low viscosity, co-solvent. A common electrolyte used in LIBs is $LiPF_6$ dissolved in 1:1 ethylene carbonate-dimethyl carbonate. In some cases, the solution is supported within a gel structure. This electrolyte sacrifices safety (flammability), iconicity, and transport number, but provides acceptable conductivity, and is suitable for use with high voltage cathodes.

A modification of the liquid electrolyte approach that eliminates the molecular solvent, with increase in safety, is the use of ionic liquid solvents for the lithium salt, but this strategy also has the problem that the lithium ion typically becomes the least mobile species in the mixture. This is due to its greater charge intensity that leads it to dominate the electrostatic (or charge polarization) competition for nearest neighbor anions so that it "digs itself a trap". This problem can typically be mitigated by choosing the least polarizable anions possible, hence the predominance of fluorinated anion species in electrolytes of this type. While cells with such electrolytes can function with high cyclability, the current, hence power, is restricted.

An alternative strategy for avoiding liquid and molecular solvents involves the use of organic cation salts in plastic crystalline states as solvents in which smaller amounts of lithium salts, usually with the same anions, can be dissolved. These electrolytes, however, demonstrate low conductivity and $Li^+$-trapping. Other electrolytes that have been explored include crystalline fast ion conductors like sodium β" alumina, LiSicon, and thiophosphogermanates, in which the alkali cation is generally the only mobile ion. These electrolytes, however, can have limited appeal based on factors such as toxicity. Moreover, with a few exceptions, their conductivities are typically below $10^{-2}$ S/cm at ambient temperature. Fast ion glassy and glass-ceramic electrolytes have also been investigated, but are limited by conductivities that rarely exceed $10^{-3}$ S/cm.

SUMMARY

Inorganic plastic crystal electrolytes, also referred to herein as inorganic plastic crystal conductors or single ion conductors, and synthesis thereof, are described herein. These electrolytes provide high conductivity and low flammability, and are thus desirable for use as electrolytes for alkali batteries.

In a first general aspect, a composition includes $[AB_{x-y}C_y]^{y-}[M]_y^+$, where A is a tetravalent to hexavalent atom; B is a monovalent ligand; C is an oxyanion; M is an alkali metal; x is 4 when A is tetravalent, x is 5 when A is pentavalent, and x is 6 when A is hexavalent; y is an integer from 1 to x−1 inclusive; and $[AB_{x-y}C_y]^{y-}[M]_y^+$ is rotationally disordered and ionically conductive.

Implementations of the first general aspect may include one or more of the following features. In some cases, A is selected from groups 4 and 14 to 16 in the periodic table. For example, A may be selected from the group consisting of Si, P, C, Ge, Ti, Zr, As, or Te. In certain cases, B is selected from the group consisting of halogen atoms, cyano groups, methoxy, ethoxy, acetate groups. C may be a "hard" anion in the Pearson HSAB sense carrying a charge that is one unit more negative than B. C may be selected from the group consisting of sulfate, selenite, fluorophosphate, and trifluoromethane phosphate. In certain examples, M is lithium or sodium. $M^+$ may be mobile. In one example, A is silicon, B is chlorine, C is sulfate, M is lithium or sodium, x is 4, and y is 1 to 3 inclusive. In another example, A is phosphorus, B is chlorine, C is sulfate, M is lithium, x is 5, and y is an integer from 1 to 4 inclusive. In another example, A is carbon, B is chlorine, C is sulfate, M is lithium, x is 4, and y is an integer from 1 to 3 inclusive.

In a second general aspect, a composition includes a tetravalent silicon compound having one or more oxyanions and one or more alkali cations, which is charge compensated by the one or more alkali cations, in which at least one of the alkali cations is weakly bound and mobile.

Implementations of the second general aspect may include one or more of the following features. In some cases, the tetravalent silicon compound is the reaction product of silicon tetrachloride, sulfuric acid, and lithium amide. In certain cases, the sulfuric acid protons are removed sequentially as HCl and $NH_3$.

In a third general aspect, a composition includes the reaction product of sulfuric acid, silicon tetrachloride, and an alkali metal compound, such as alkali amide, that replaces the protons of silicosulfuric acid with alkali metal ions.

Implementations of the third general aspect may include one or more of the following features. The alkali amide may be lithium amide ($LiNH_2$). In some cases, the molar ratio of sulfuric acid to silicon may be 4:1 or greater, 3:1 or greater, or 2:1 or greater, and the molar ratio of alkali to silicon may be 4:1 or greater, 3:1 or greater, or 2:1 or greater. The composition may be in the form of a plastic crystal. In certain cases, the conductivity of the composition is at least $10^{-3}$ $Scm^{-1}$. An electrochemical device, such as a lithium ion battery, may include the composition of the third general aspect as an electrolyte. An apparatus may include the electrochemical device.

In a fourth general aspect, a composition includes a first inorganic plastic crystal electrolyte and a second inorganic plastic crystal electrolyte. The first inorganic plastic crystal electrolyte includes the reaction product of sulfuric acid, silicon tetrachloride, and an alkali amide; and the second inorganic plastic crystal electrolyte includes the reaction product of sulfuric acid, silicon tetrachloride, and an alkali amide.

Implementations of the fourth general aspect may include one or more of the following features. In some cases, the alkali amide is $LiNH_2$. The first inorganic plastic crystal electrolyte may have a molar ratio of sulfate to silicon and alkali to silicon of 2:1 or greater and the second inorganic plastic crystal electrolyte may have a molar ratio of sulfate to silicon and alkali to silicon of 3:1 or greater. An electrochemical device, such as an alkali ion battery, may include the composition of the fourth general aspect as an electrolyte.

In a fifth general aspect, sulfuric acid and silicon tetrachloride are combined to form a liquid mixture, and after reaction to form a solid acid, an alkali amide is combined with the solid acid portion to yield an inorganic plastic crystal electrolyte.

Implementations of the fifth general aspect may include one or more of the following features. For example, the liquid mixture may be centrifuged to yield a supernatant, and the alkali amide may be combined with the centrifugate to yield the inorganic plastic crystal electrolyte. In some cases, the inorganic plastic crystal electrolyte may be homogenized. The inorganic plastic crystal electrolyte may be mixed with a second inorganic plastic crystal electrolyte to yield a mixture of inorganic plastic crystal electrolytes.

In a sixth general aspect, an inorganic plastic crystal electrolyte includes $M_xSi(SO_4)_xY_{(4-x)}$, where M is an alkali metal, Y is a monovalent ligand, and x is an integer from 1 to 3 inclusive.

Implementations of the sixth general aspect may include one or more of the following features. For example, M may be lithium or sodium.

In a seventh general aspect, an inorganic plastic crystal electrolyte includes a mixture of $M_xSi(SO_4)_xY_{(4-x)}$, where M is an alkali metal, Y is a monovalent ligand, and x is an integer from 1 to 3 inclusive.

Implementations of the seventh general aspect may include one or more of the following features. For example, M may be lithium or sodium.

These general and specific aspects may be implemented using a device, system or method, or any combination of devices, systems, or methods. The details of one or more embodiments are set forth in the accompanying drawings and the description below. Other features, objects, and advantages will be apparent from the description and drawings, and from the claims.

DETAILED DESCRIPTION

Figure 1:
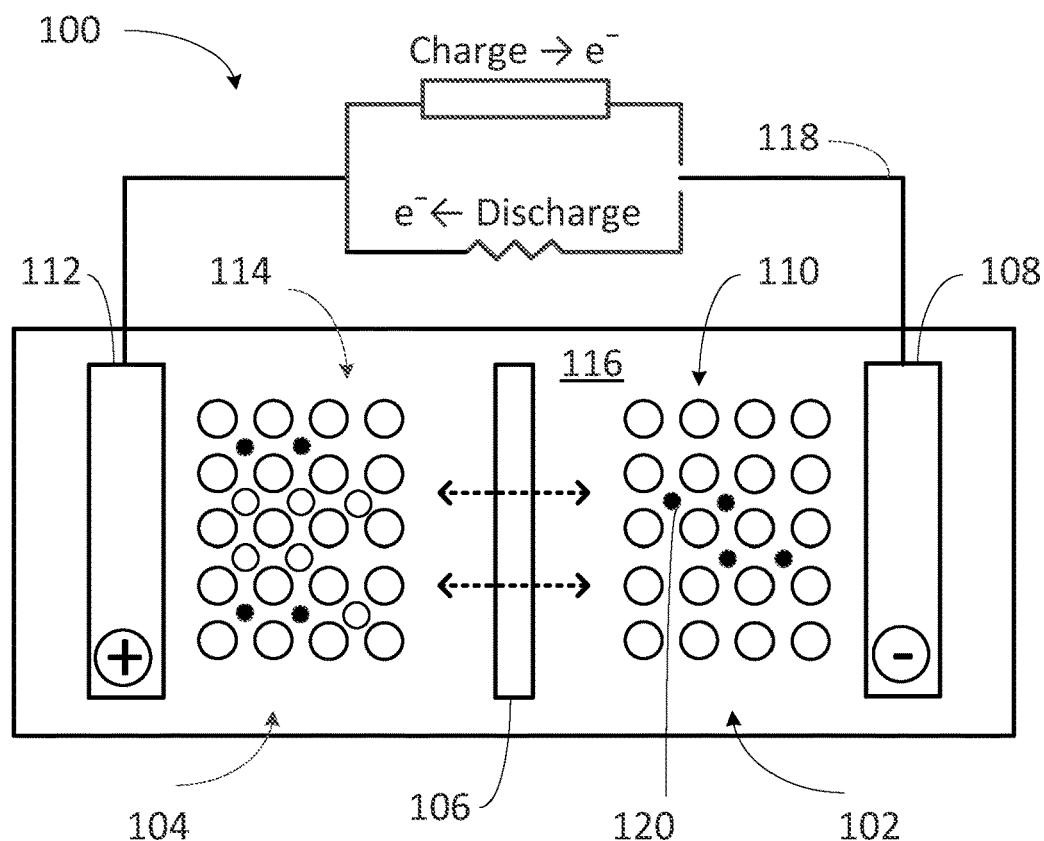
FIG. 1 depicts an electrochemical device.
Figure 2:
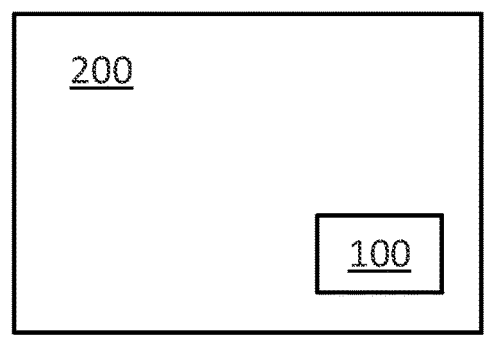
FIG. 2 depicts an apparatus including an electrochemical device.

Inorganic plastic crystal electrolytes, also referred to herein as inorganic plastic crystal conductors or single ion conductors, an synthesis thereof, are described herein. "Plastic crystal" generally refers to a mechanically soft crystal composed of weakly interacting molecules that possess some orientational or conformational internal degree of freedom. If the internal degree of freedom is molecular rotation, the plastic crystal may be referred to as a rotator phase crystal. Plastic crystals are typically characterized by the presence of asymmetric particles of globular or short tube-like character. They resemble waxes and are easily deformed. Plastic crystals may exhibit a glass transition (e.g., if they do not first reorganize to closer-packed non-rotator states). In contrast to glasses, however, which retain their shape only up to the glass transition temperature, where the shear modulus decays to zero on the 100 second time scale, plastic crystals retain their solidity (finite shear modulus) up to higher temperatures, limited by their melting points.

For plastic crystal conductors that contain loosely bound alkali ions, a class of solid electrolytes generally referred to herein as "ionic rotator phase conductors," the ability to remain solid above the glass transition temperature allows higher solid state ionic conductivities than those attained with glasses that have loosely bound alkali ions. These ionic rotator phase conductors include organic and inorganic solid electrolytes derived, for example, by replacing one or more of the atoms or groups B, in compounds having a formula $AB_x$, where A is a tetravalent to hexavalent atom (e.g., atoms from groups 4 and 14 to 16 of the periodic table, including Si, P, C, Ge, Ti, Zr, As, Te, and the like) and B is one or more different monovalent substituents including halogen atoms, cyano groups, methoxy, ethoxy, acetate groups, and the like, with a "hard" anion C (i.e., an anion that, in the sense of Pearson's "hard and soft acids and bases" (HSAB), provides an unpolarizable electron exterior), and then compensating the charge imbalance with an alkali cation. Hard anions C include, for example, oxyanions such as sulfate, selenite, fluorophosphate, trifluoromethane phosphate, and the like.

The charge compensating alkali cation(s), being monovalent, is weakly bound and moves freely through the plastic crystal phase produced by facile rotation of the anion. Rotationally disordered solids are referred to herein as ionic rotator phase conductors and represented as the neutral species $[AB_{x-y}C_y]^{y-}[M]_y^+$, in which A is a tetravalent to hexavalent atom; B is a monovalent ligand; C is a hard anion; and M is an alkali metal; x is 4 when A is tetravalent, x is 5 when A is pentavalent, and x is 6 when A is hexavalent; and y is an integer from 1 to x−1 inclusive. The ionic conductivity of these ionic phase rotator conductors is high, making these solid state alkali conducting materials suitable for use in lithium ion batteries and other electrochemical devices.

In one example, a plastic crystal based on $SiCl_4$ is formed as an anion with silicon at the center and charge compensated by an alkali cation that moves freely through the plastic crystal phase produced by the facile rotation of the anion. To convert the $SiCl_4$ molecule to an anion without destroying a facile axis of rotation, one or more of the chlorine atoms is replaced by a hard anion carrying a higher charge than chlorine and occupying a comparable volume, and the charge imbalance is compensated with an alkali cation. This ionic phase rotator conductor is represented by the general formula $[SiCl_{(4-y)}(SO_4)_y]^{y-}[M]_y^+$, where y is an integer from 1 to 3 inclusive and M is an alkali atom (e.g., $[SiCl_3SO_4]^-[Li]^+$ when y=1). Other examples include derivatives of compounds $AB_x$ where A is carbon (e.g., $CCl_4$, $C(OEt)_4$, $C(OAc)_4$, etc.), P ($PCl_5$, $P(OEt)_4$), and the like, to yield ionic phase rotator conductors such as $[PCl_{(5-y)}SO_4)_y]^{y-}[M]_y^+$, where y is an integer in a range from 1 to 4 inclusive and M is an alkali ion, and $[CCl_{(4-y)}SO_4)_y]^{y-}[M]_y^+$, where y is an integer in a range from 1 to 3 inclusive, and M is an alkali atom.

Figure 3:
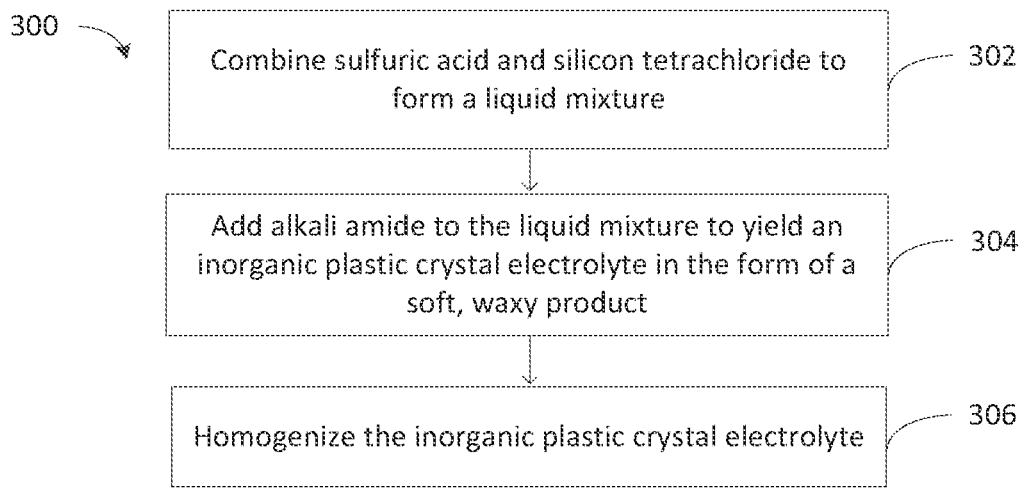
FIG. 3 is a flow chart showing synthesis of an inorganic plastic crystal electrolyte.

FIG. 3 is a flow chart showing exemplary process 300 for preparation of inorganic plastic crystal electrolytes as described herein. In other cases, reactants will vary based on the identity of A, B, C, and M in the chemical formula $[AB_{x-y}C_y]^{y-}[M]_y^+$. In 302, nominally anhydrous sulfuric acid and silicon tetrachloride (liquid) are combined to form a liquid mixture. The sulfuric acid and silicon tetrachloride react under mild conditions, releasing HCl gas which is removed from the reaction zone. Mild conditions include, for example, stirring at 50° C. In 304, an alkali amide is then added to the liquid mixture formed in 302. The alkali amide neutralizes protons remaining in the liquid mixture from the reaction of sulfuric acid and silicon tetrachloride, replacing them with alkali cations. Addition of the alkali amide yields an inorganic plastic crystal electrolyte in the form of a soft, waxy product. The inorganic plastic crystal electrolyte may be homogenized in 306 (e.g., in a ball mill or similar apparatus known in the art). Materials of different alkali content and different conductivity can be obtained by varying the proportions of sulfuric acid, silicon tetrachloride, and/or alkali amide used in the reaction. Mixtures of two or more different inorganic plastic crystal electrolytes may be formed to yield compositions with an increased stability.

For the inorganic plastic crystal electrolytes or ionic rotator phase conductors $[AB_{z-x}C_x]^{x-}[M]_x^+$ described herein, M is the mobile species and A is a high charge (oxidation number) Lewis acid species. That is, electrolytes that contain elements in their maximum oxidation states (oxygen excepted), are typically inert to oxidizing conditions at cathodes.

Preparation of Exemplary Inorganic Plastic Crystal Electrolytes

EXAMPLE 1

Li4

4 moles of nominally anhydrous sulfuric acid are added to 1 mol of silicon tetrachloride (with 50% excess in mass) under nitrogen atmosphere. The mixture was kept at room temperature and stirred for 5 hours to yield a colorless, transparent liquid and a small quantity of a white, gel-like solid (less than 1% in mass of total product). The solid was separated from the liquid by centrifugation for 2 hours. 4 moles of lithium amide ($LiNH_2$) were added to the liquid product, under nitrogen atmosphere and constant stirring. A slight excess of the amide (10% in moles) was subsequently added to ensure the completion of the reaction. The resulting white, waxy solid was homogenized in a ball mill for 1 hour to yield the inorganic plastic crystal electrolyte referred to herein as "Li4." Li4 exhibits an endothermic transition at 120° C. that may be an order-disorder (OD) transition for the rotation of the anions. A possible structure of Li4 is $Li4Si(SO_4)_4$.

EXAMPLE 2

Li2

2 moles of nominally anhydrous sulfuric acid were added to 1 mol of silicon tetrachloride (with 50% excess in mass) under nitrogen atmosphere. The mixture was kept at room temperature and stirred for 5 hours to yield a colorless, transparent liquid and a small quantity of a white, gel-like solid. The solid was separated from the liquid by centrifugation for 2 hours. 2 moles of lithium amide were then added to the liquid product, under nitrogen atmosphere and constant stirring. A slight excess of the amide (10% in moles) was subsequently added to ensure the completion of the reaction. The resulting white, waxy solid obtained was homogenized in a ball mill for 1 hour to yield the inorganic plastic crystal electrolyte referred to herein as "Li2." From calorimetric (differential scanning calorimetry) studies, Li2 is shown to have an initial "order-disorder" (OD) type of transition with peak at 80° C. Not to be bound by theory, it is believed that Li2 may have a chemical formula of $Li_2Si(SO_4)_2Cl_2$.

EXAMPLE 3

Li3

3 moles of nominally anhydrous sulfuric acid were added to 1 mol of silicon tetrachloride (with 50% excess in mass) under nitrogen atmosphere. The mixture was kept at room temperature and stirred for 5 hours to yield a colorless, transparent liquid and a small quantity of a white, gel-like solid. The solid was separated from the liquid by centrifugation for 2 hours. 3 moles of lithium amide were then added to the liquid product, under nitrogen atmosphere and constant stirring. A slight excess of the amide (10% in moles) was subsequently added to ensure the completion of the reaction. The white, waxy solid obtained was homogenized in a ball mill for 1 hour to yield the inorganic plastic crystal electrolyte referred to herein as "Li3." Li3 has an initial OD temperature of 80° C. Not to be bound by theory, it is believed that Li3 may have a chemical formula of $Li_3Si(SO_4)_3Cl$.

Figure 4:
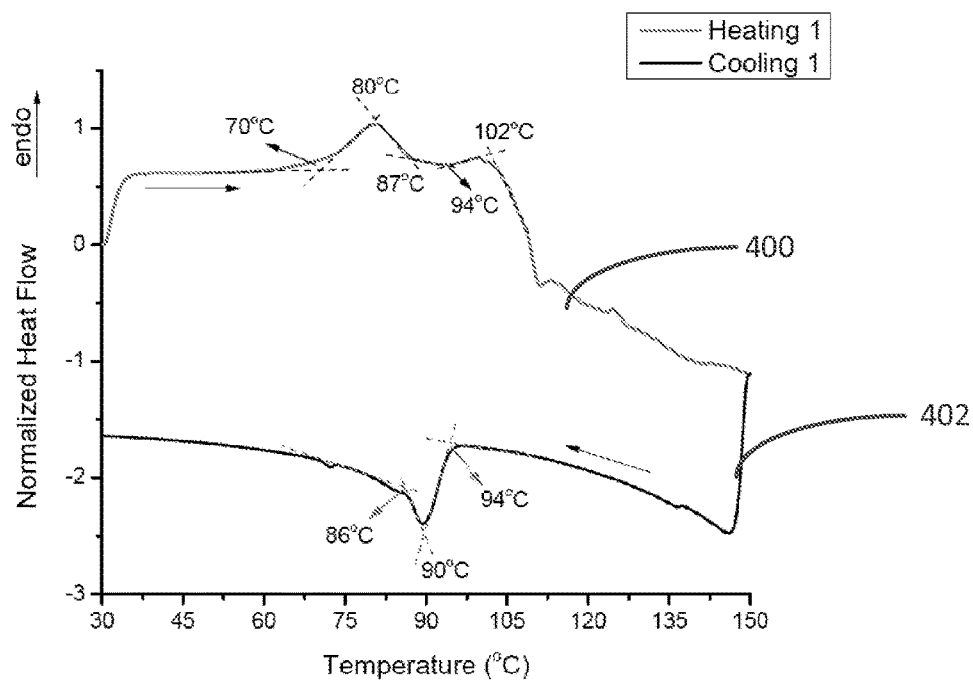
FIG. 4 shows a differential scanning calorimetry (DSC) scan for an inorganic plastic crystal electrolyte immediately after preparation.

FIG. 4 is a plot of the heat flow in a differential scanning calorimeter during increase of temperature on a sample of freshly prepared Li3 plastic crystal (plot 400), and then on subsequent cooling (plot 402), as indicated by arrows. The two peaks representing the end of the rotational disordering process during heating become a single lambda-like peak during cooling, and as seen more clearly in the scans made the next day shown in FIG. 5.

Figure 5:
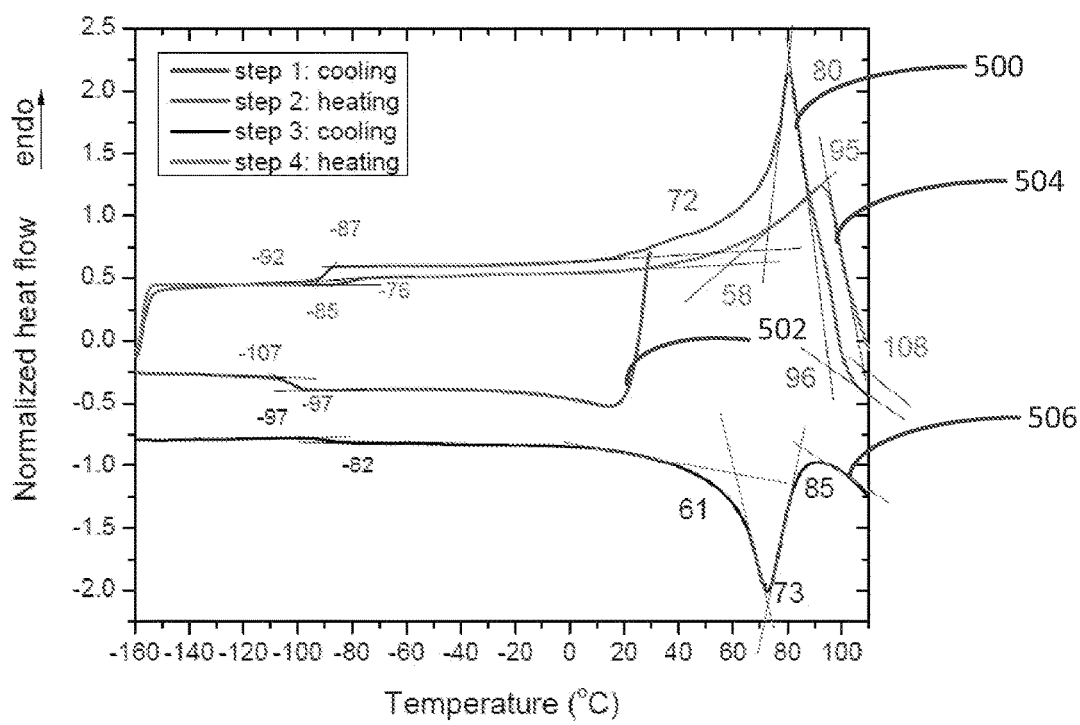
FIG. 5 shows full temperature range DSC scans for the inorganic plastic crystal electrolyte of FIG. 4.

FIG. 5 shows a sequence of DSC scans including plots 500, 502, 504, and 506 corresponding to the first heating, first cooling, second heating, and second cooling scans, respectively. The scans include the low temperature part of the thermal excitation process (i.e. the low temperature part of the FIG. 4 scans), showing that the lambda transition believed to mark the complete disordering of the anion rotations in the crystal, on heating terminates during cooling in the arrest of the ordering process at a glass transition. It is seen that the ordering process that (during cooling) begins abruptly at 85° C. (plot 506) ends in a (cooling) glass transition at –82° C. as the rotational degrees of freedom are arrested in a glass transition. This cooling glass transition is not as sharp as the one observed at –97° C. on the initial cooling (plot 502), which then became an onset heating glass transition at –92° C. on first complete heating (plot 500) for which the peak heat capacity was reached at 80° C. The state of the system is observed to be somewhat irreproducible once the heating has been taken above the transition temperature.

Except for the drift with time, FIG. 5 shows the characteristics of a cooperative disordering transition (commonly called a "lambda" transition) with a critical point, at which the order parameter falls to zero, at 80° C. on the first heating (plot 500). Such transitions do not generally have energy barriers to the ordering process and therefore show little or no hysteresis in the transition on reversal of the temperature change (unlike first order transitions which typically commence at significantly lower temperatures on cooling due to the presence of an energy barrier for the nucleation process). The present instance is, however, distorted by kinetic instability insofar as once the system has disordered completely and cooled down again, it does not exactly repeat itself on the next cycle. Rather the disordering is not as sharp and the heat capacity peak is postponed to higher temperature.

Figure 6:
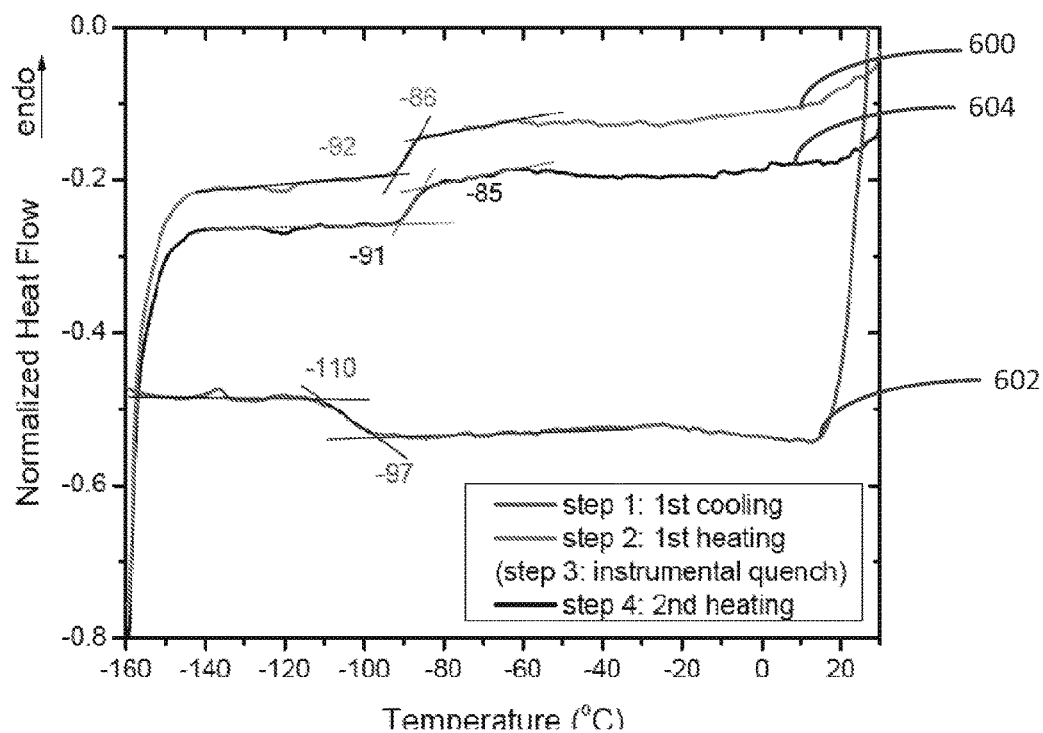
FIG. 6 shows repeat low temperature DSC scans taken three days after those of FIG. 4.

Samples that have been maintained at temperatures not exceeding room temperature (25° C.) seem to be less prone to loss of their character. This is exemplified by the repeat heating and cooling runs of FIG. 6, in which plots 600, 602, and 604 correspond to a first heating scan, a first cooling scan, and a second heating scan, respectively, of Li3 taken three days after those in FIG. 4. These repeat low temperature DSC scans indicate that the structure yielding the glass transition of FIG. 5 is stable over days of exposure to temperatures not exceeding room temperature. The "onset cooling" glass temperature in this sample, measured during the initial cooling (plot 602) is –97° C.

Figure 7:
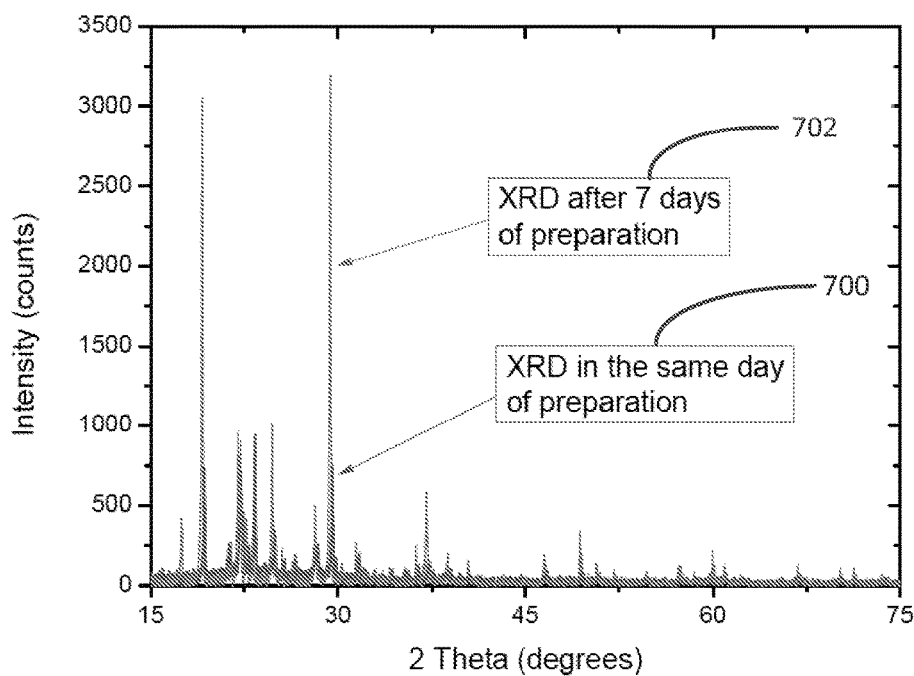
FIG. 7 shows an X-ray powder diffraction pattern for an inorganic plastic crystal electrolyte taken at different times after the initial preparation.

The crystalline nature of Li3 is shown by the X-ray powder diffraction patterns 700 and 702 of FIG. 7. Pattern 700 corresponds to Li3 on the day of sample preparation. Pattern 702 corresponds to the same sample seven days after preparation. The decrease in conductivity of Li3 over the course of several days appears to be associated with a change of structure to states of high crystallinity (e.g., growth of new and more ordered crystal structures with passing time) as indicated by the growth of intensity for some principal lines and the addition of new lines in X-ray pattern 702 compared to that of 700.

Figure 8:
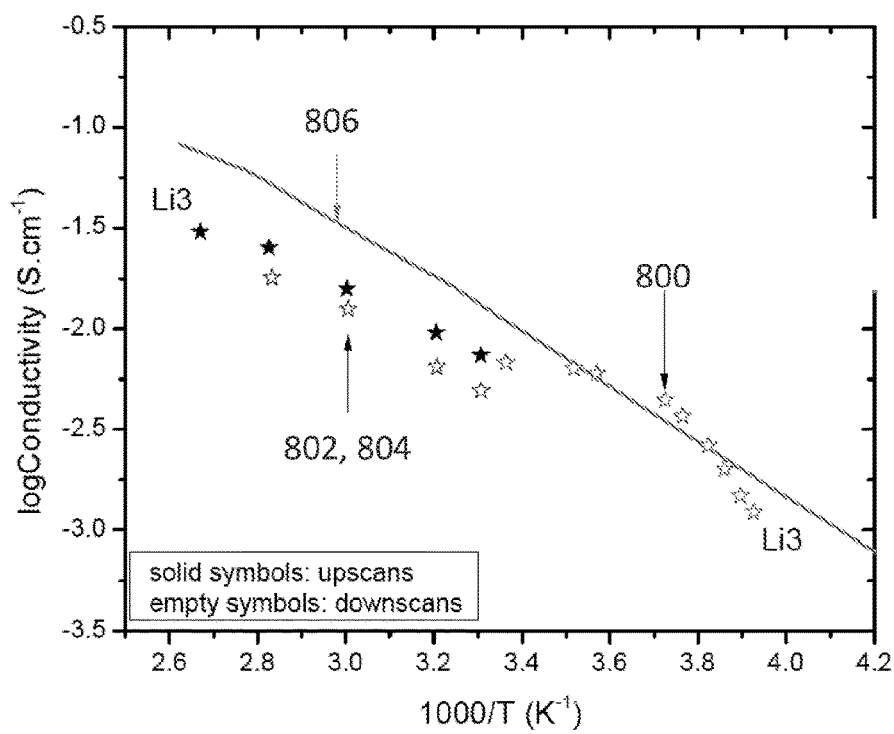
FIG. 8 shows conductivities for an inorganic plastic crystal electrolyte.

FIG. 8 shows conductivities for Li3 over a range of temperatures, with the data indicated by reference numbers 800 taken on the day of preparation and the data indicated by reference numbers 802 and 804 taken the following day. Reference number 804 indicates data from DSC upscans and reference numbers 800 and 802 indicate data from DSC downscans. Plot 806 shows an Arrhenius plot for the conductivity of the crystalline solid lithium ion conductor $Li_{10}GeP_2S_{12}$, taken from Kamaya et al., Nature Materials 10, 682 (2011).ft makes a comparison with the conductivity of the standard lithium battery electrolyte $LiPF_6$ in molecular carbonate solvents, showing the low temperature conductivity of the $Li_{10}GeP_2S_{12}$. Based on this data, Li3 appears to maintain high conductivity at low temperatures.

Figure 9:
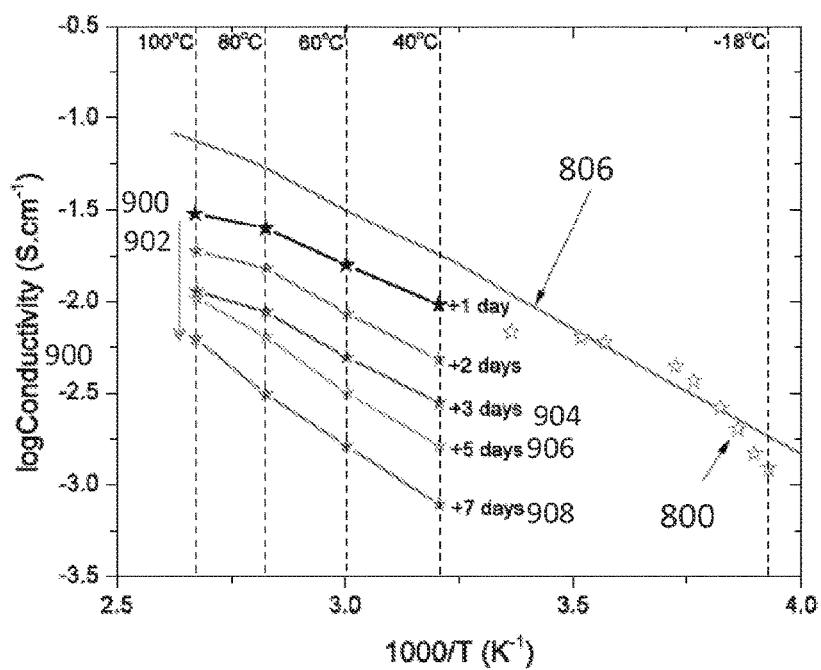
FIG. 9 shows a decrease in conductivity of an inorganic plastic crystal electrolyte over time.
Figure 10:
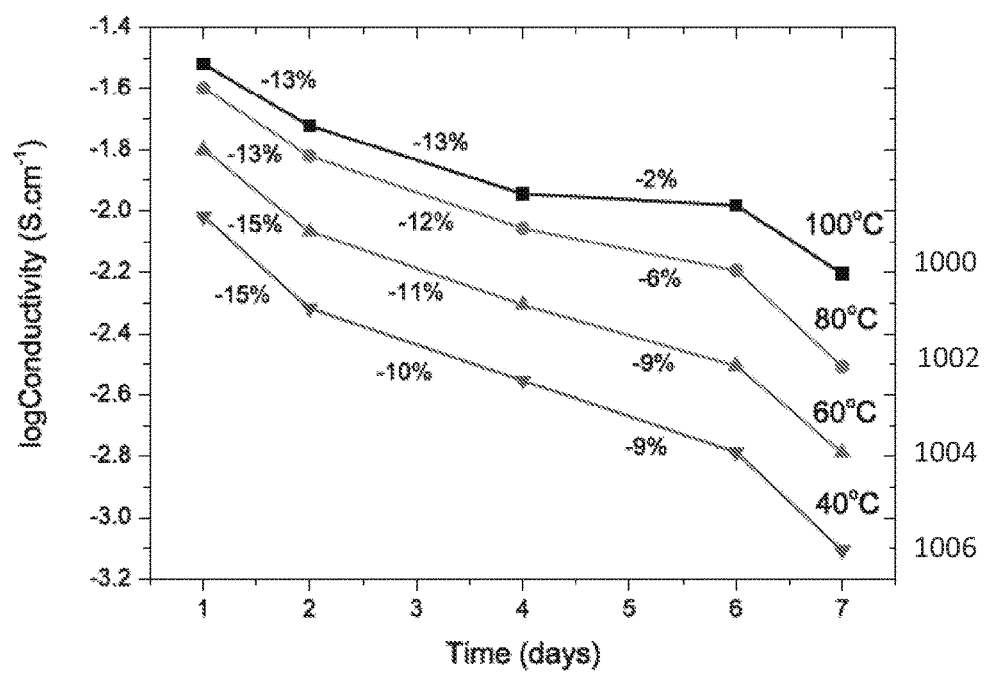
FIG. 10 shows time dependence of conductivity of an inorganic plastic crystal electrolyte at different temperatures.

FIG. 9 shows a decrease of Li3 sample conductivity with time, with plots 900, 902, 904, 906, and 908 corresponding to 1, 2, 3, 5, and 7 days after preparation, respectively. Data points 800 and plot 806 from FIG. 8 are included for reference. FIG. 10 shows the decrease in conductivity over time (up to 7 days after preparation) for Li3 for various temperatures, with plots 1000, 1002, 1004, and 1006 corresponding to 100° C., 80° C., 60° C., and 40° C., respectively.

EXAMPLE 4

Li2:Li3 (50:50 Mixture)

The solids Li2 and Li3 were prepared as described in Examples 2 and 3, respectively, and mixed together in a ball mill in the absence of heating (e.g., without raising the temperature) for 1 hour to yield a homogenous, white solid. Mixing Li2 and Li3 lowers, by entropy of mixing, the chemical potential of the phase that tends to crystallize, thereby stabilizing the mixture compared to Li2 or Li3 alone. The mixture of Li2 and Li3 yields an inorganic plastic crystal electrolyte with conductivity as high as that of Li3 in its initial (un-aged) state.

Figure 11:
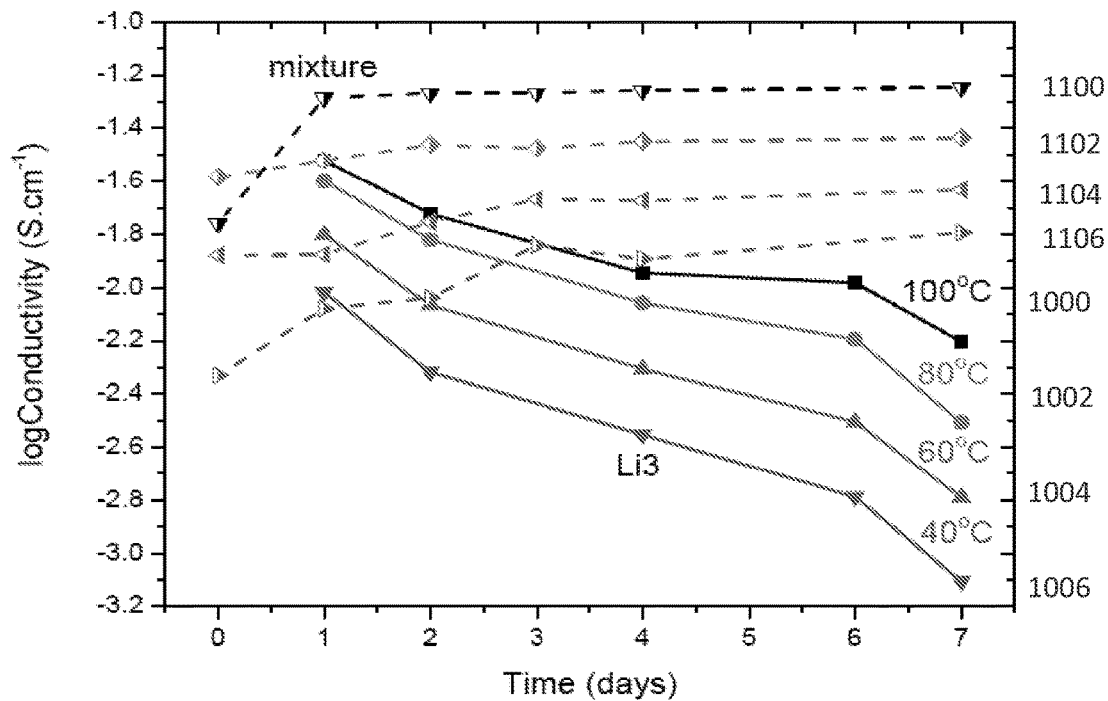
FIG. 11 shows a comparison of the time dependence of conductivity of the inorganic plastic crystal electrolyte of FIG. 10 and a mixture of inorganic plastic crystal electrolytes.

The subsequent stabilization of the system against deterioration, obtained by mixing of Li3 and Li2 compositions, is shown in FIG. 11, with plots 1000, 1002, 1004, and 1006 from FIG. 10 (Li3) for comparison, and plots 1100, 1102, 1104, and 1106 showing the time dependence of the conductivity of the Li2:Li3 (50:50) mixture at 100° C., 80° C., 60° C., and 40° C., respectively. As seen in FIG. 11, the conductivity is stabilized at values of 10-1.2 S/cm at 100° C. and 10-1.8 S/cm at 40° C. (~10-2 S/cm at ambient). After three days, the mixture conductivities have all stabilized at values that exceed their initial values. Even in the "aged" state, the conductivity remains high for a solid state conductor.

EXAMPLE 5

Na2

The sodium analog of Li2 was prepared by a similar procedure, with a difference being the introduction of the alkali metal as the chloride which reacted with the sulfosilicic acid releasing HCl. The reaction using the amide in place of halide is more strongly driven, however, and was used in subsequent preparations. The conductivity of the product of reaction, thought to be $Na_2Si(SO_4)_2Cl_2$, was found to increase suddenly, as in a first order transition, from ~1 mS/cm at 60° C. to 100 mS/cm at 100° C., and then to remain in the high-conducting state during cooling to ambient.

Figure 12:
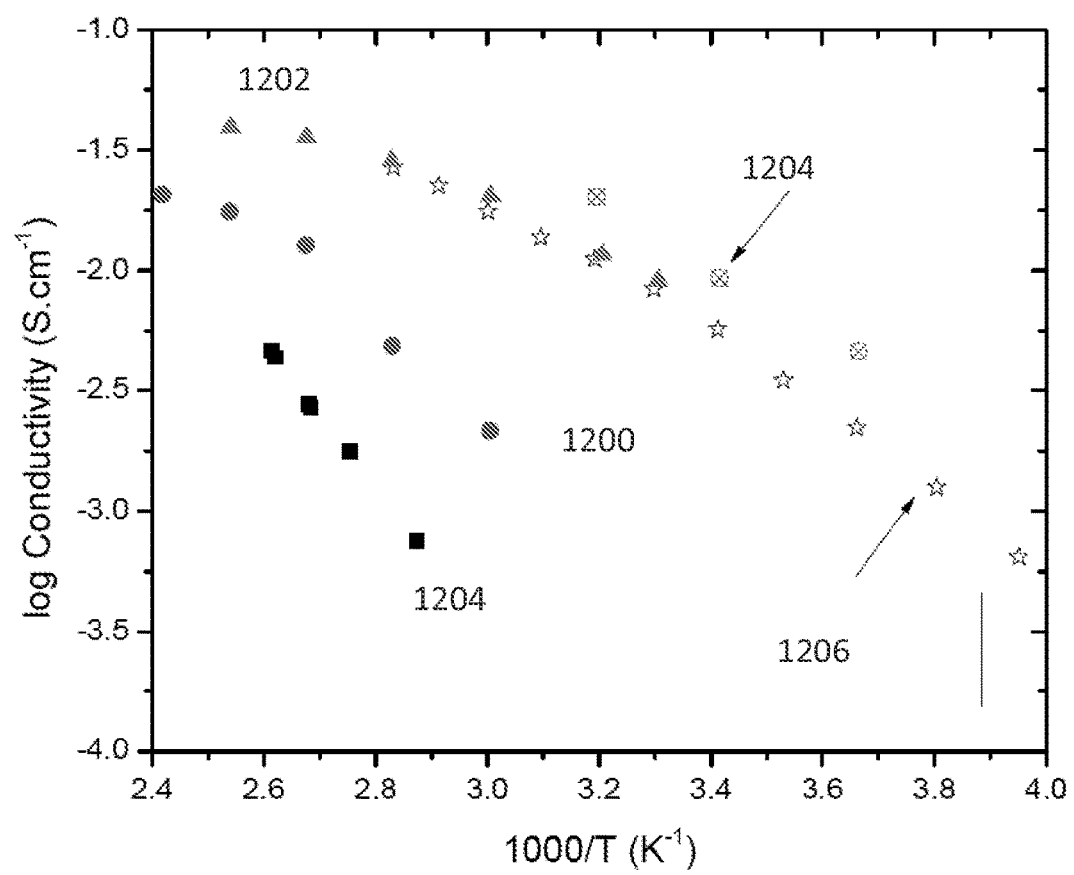
FIG. 12 is an Arrhenius plot of the ionic conductivity of three inorganic plastic crystal electrolytes and other electrolytes.

FIG. 12 is an Arrhenius plot, (i.e. a plot of the log (electrical conductivity) vs. reciprocal absolute temperature) for Li2 (solid circular data points labeled 1200), Li3 (solid triangular data points labeled 1202), and Li4 (solid square data points labeled 1204) prepared as described in Examples 1-3. Comparison is made with literature values for an ionic liquid polymer gel (Li bis(trifluoromethylsulfonyl)imide (LiTFSI)/1-ethyl-3-methylimidazolium bis(trifluoromethylsulfonyl)imide (EMIm TFSI), from Kim et al., J. Phys. Chem. 110, 16318 (2006), star data points labeled 1206), and the standard carbonate solvent electrolyte ($LiPF_6$/ethylene carbonate (EC)/dimethyl carbonate (DMC), from Tarascon et al., Solid State Ionics 69, 293 (1994), open circular data points with internal crosses labeled 1204).

Li2, Li3, and Li4 differ in the ratio of sulfuric acid to silicon in the initial acid production and consequently in the ratio of lithium to silicon in the final product. The data in FIG. 12 show that the Arrhenius equation commonly applicable to conductivity in crystalline or glassy materials does not give a good description of the conductors of the inorganic plastic crystal electrolytes described herein, though the curvature in the plots is smaller that of the molecular solvent ($LiPF_6$/EC/DMC as shown by 1208), or the ionic liquid gel polymer (LiTFSI/EMIm TFSI polymer electrolyte as shown by 1206). The lower curvature observed for Li2, Li3, and Li4 suggests that the low temperature conductivity of these electrolytes will remain high, unlike those of the molecular solvent and ionic liquid cases.

Preparation of Solid Acids and Solid Lithiated Compounds, for Compositions Li3 to Li1

As described below, a strong preference for formation of the fully sulfated silicosulfuric acid, i.e. $Si(SO_4H)_4$, rather than the compound most closely related to the initial composition stoichiometry, has been observed. This tetrasulfated formulation can be reliably formed using $SiCl_4$ as the starting material. For the other three, partially sulfated cases (Li1 through Li3), precursors are used in which there is a bulky group that is displaced from its silicon coordination much more rapidly than is the chlorine. The family of commercially available chlorophenylsilanes are examples of such precursors.

For each example described below, the stoichiometric (molar) amount of nominally anhydrous sulfuric acid was added to 1 mol of: trichlorophenylsilane (to yield "H1"); or to dichlorodiphenylsilane (to yield "H2"); or to chlorotriphenylsilane (to yield "H3"). All of the reactions were carried out in 20 mL of dichloromethane and were kept at room temperature, closed, under nitrogen atmosphere and constant stirring for 24 hours. This yielded white waxy solids (yellow in the case of H3).

A stoichiometric amount of lithium amide was then added to each of the solid products, under nitrogen atmosphere and constant homogenization with an agate mortar and pestle. A slight excess of the amide (10 mol %) was subsequently added to ensure the completion of the reaction. The white powders resulting from H1, H2, and H3 are referred to herein as "Li1," "Li2," and "Li3," respectively.

EXAMPLE 6

Li4

4 moles of nominally anhydrous sulfuric acid were added to 1.5 mol of silicon tetrachloride (i.e., a 50 mol % excess to ensure there would be no excess $H_2SO_4$) under nitrogen atmosphere. The mixture was kept in a closed system, comprised of a 3-neck Schlenk reaction flask, with a cold finger kept at around −20° C. and an internal HCl trap, kept in a separate tube connected to the Schlenk flask. The HCl trap is a liquid adduct formed by the mixture of 70 wt % of an equimolar diethylmethylamine-aluminum chloride adduct and 30 wt % of an equimolar 2-methylpyridine-aluminum chloride adduct.

The reaction mixture was kept at around 50'C and stirred for 40 hours, yielding a colorless, transparent liquid (presumed to be the excess $SiCl_4$) and a white, gel-like solid. The solid was separated from the liquid by centrifugation for 2 hours and the excess liquid was evaporated by a continuous dry nitrogen gas flow. To obtain the lithium salt, 4 moles of lithium amide ($LiNH_2$) were gradually added to the solid product under nitrogen atmosphere with constant homogenization by means of an agate mortar and pestle. A slight excess of the amide (10 mol %) was subsequently added to ensure the completeness of the reaction. The resulting white powder is referred to herein as "Li4". The composition of Li4 is thought to be $Li_4Si(SO_4)_4$.

EXAMPLE 7

Li3

3 moles of nominally anhydrous sulfuric acid were added to 1 mol of chlorotriphenylsilane, dissolved in 20 mL of dichloromethane, under nitrogen atmosphere. The mixture was kept at room temperature and stirred for 24 hours to yield a yellow waxy solid. 3 moles of lithium amide were then added to the solid product, under nitrogen atmosphere and constant homogenization with an agate mortar and pestle. A slight excess of the amide (10 mol %) was subsequently added to ensure the completion of the reaction. The resulting white powder is referred to herein as "Li3." It is believed that Li3 has a chemical formula of $Li_3Si(SO_4)_3Cl$.

EXAMPLE 8

Li2

2 moles of nominally anhydrous sulfuric acid were added to 1 mol of dichlorodiphenylsilane in 20 mL of dichloromethane under nitrogen atmosphere. The mixture was kept at room temperature and stirred for 24 hours to yield a white powder. 2 moles of lithium amide were then added to the solid product, under nitrogen atmosphere and constant homogenization with an agate mortar and pestle. A slight excess of the amide (10 mol %) was subsequently added to ensure the completion of the reaction. The resulting white powder is referred to herein as "Li2." It is believed that Li2 has a chemical formula of $Li_2Si(SO_4)_2Cl_2$.

EXAMPLE 9

Li 1

1 mol of nominally anhydrous sulfuric acid was added to 1 mol of trichlorophenylsilane in 20 mL of dichloromethane under nitrogen atmosphere. The mixture was kept at room temperature and stirred for 24 hours to yield a white waxy solid. 1 mol of lithium amide was then added to the solid product, under nitrogen atmosphere and constant homogenization with an agate mortar and pestle. A slight excess of the amide (10 mol %) was subsequently added to ensure the completion of the reaction. The resulting white powder is referred to herein as "Li1". It is believed that Li has a chemical formula of $LiSi(SO_4)Cl_3$.

Figure 13:
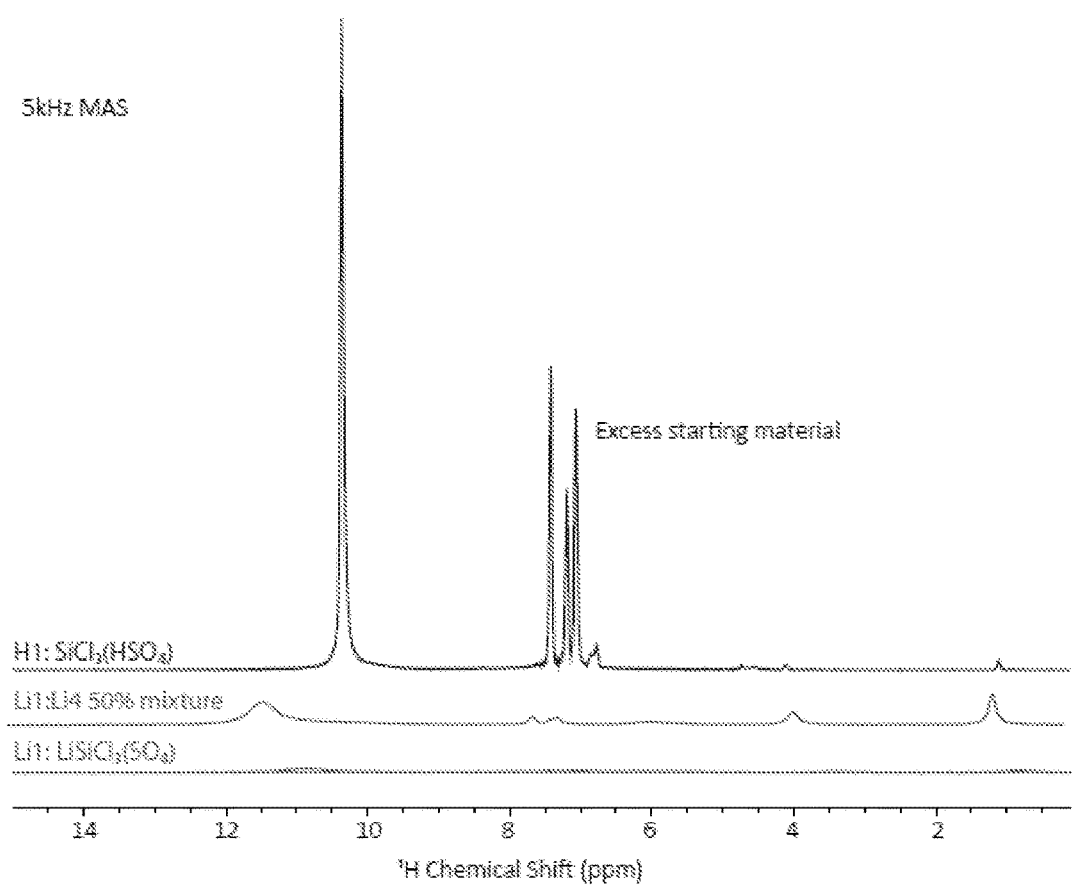
FIG. 13 shows $^1H$ solid state magic angle spinning (MAS) NMR spectra of H1, Li1, and a 50 wt % mixture of Li1 and Li4 prepared as described herein.

FIG. 13 shows $^1H$ NMR spectra of H1 ($SiCl_3(HSO_4)$) (upper trace), a 50% mixture by weight of L1 and L4 ($LiSi(SO_4)Cl_3$ and $Li_4Si(SO_4)_4$, respectively) (middle trace), and Li1 ($LiSi(SO_4)Cl_3$) (lower trace). The spike in the H1 spectrum (upper trace) is the pure H1 acid $SiCl_2(HSO_4)$. The absence of this spike in the Li1:Li4 spectrum (middle trace) and Li1 spectrum (bottom trace) is understood to be related to neutralization of the acid with the lithium amide. The bottom trace, showing a substantial absence of protons in the neutralized H1 (i.e., Li1), indicates that conductivity measured from the compound is due exclusively or substantially exclusively to lithium ions. The middle trace, from the neutralization of the mixture of Li1 and Li4, shows trace amounts of unevaporated starting material and unreacted acid. The broad peaks indicate that the protons are relatively immobile.

Figure 14:
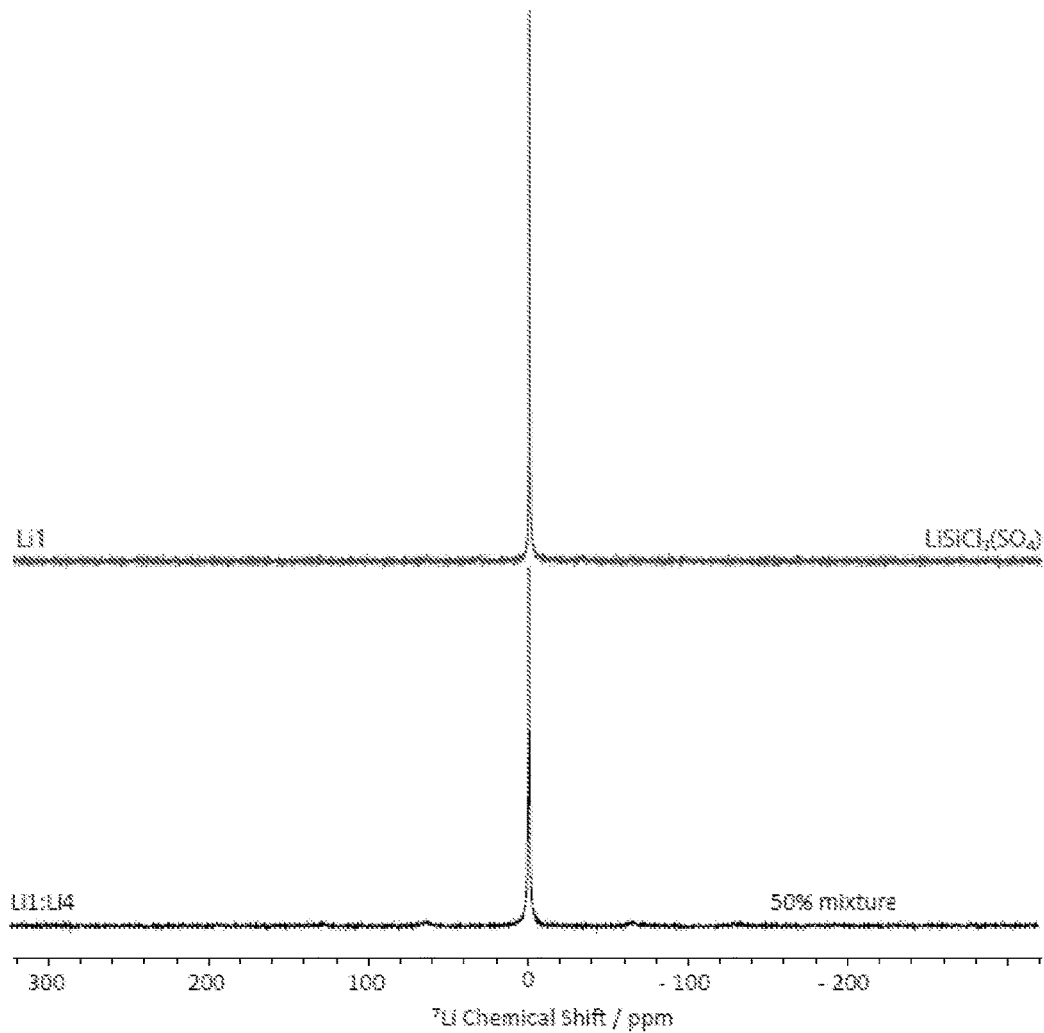
FIG. 14 shows $^7Li$ solid state magic angle spinning (MAS) NMR spectra of Li1 and a 50 wt % mixture of Li1 and Li4 prepared as described herein.

FIG. 14 shows $^7Li$ solid state magic angle spinning (MAS) NMR spectra of Li1 (upper trace) and a 50% mixture by weight of Li1 and Li4 (lower trace). Spinning side bands are absent in both spectra—an indication that the lithium atoms in both samples are highly mobile. Thus, these compounds, formed at room temperature, are expected to be excellent conductors.

Figure 15:
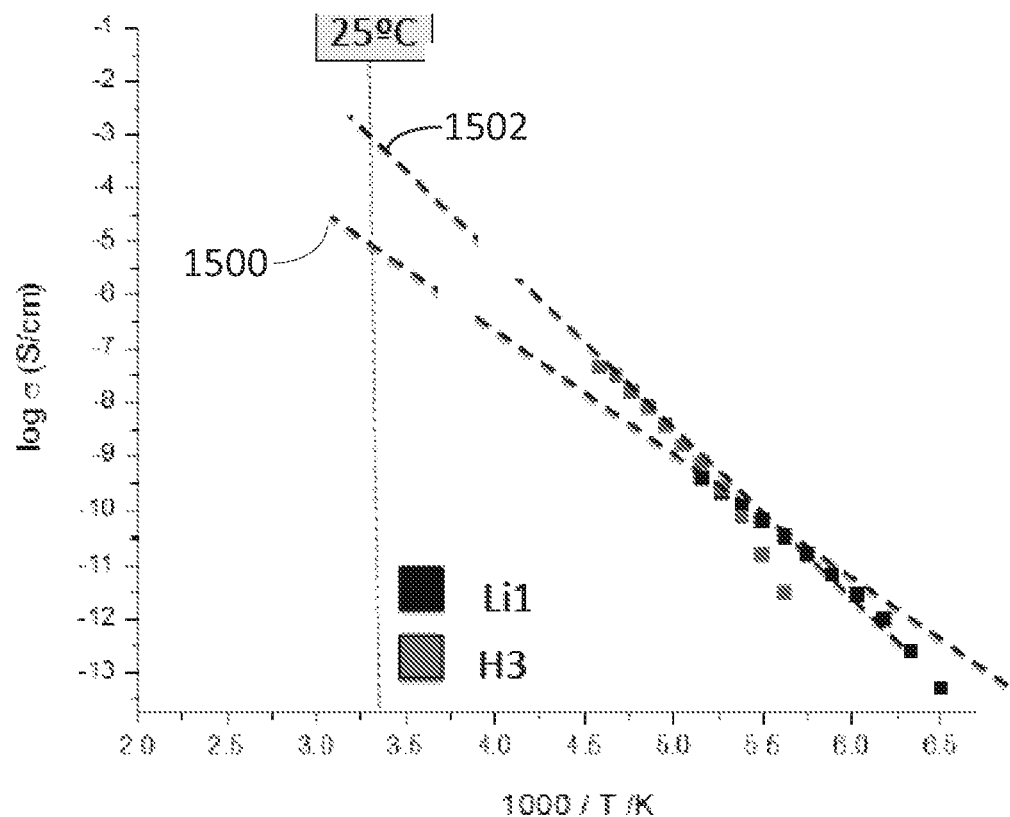
FIG. 15 shows conductivities for Li1 and H3 prepared as described herein, and measured by a technique that requires no electrode contact, but only works at low conductivities, which requires very low temperatures. In this temperature range the plastic phase has recrystallized to a less conductive form.

FIG. 15 shows low temperature conductivities for Li1 (plot 1500) and H3 (plot 1502) solid phases prepared as described herein, and in a more ordered and less conductive phase than that of the waxy material (plastic phase). This data was obtained with an "NMR tube" technique that requires no electrode contact, but only works at low conductivities, which requires very low temperatures. In this temperature range the plastic phase has recrystallized to a less conductive form.

A number of embodiments of the invention have been described. Nevertheless, it will be understood that various modifications may be made without departing from the spirit and scope of the invention. Accordingly, other embodiments are within the scope of the following claims.

What is claimed is:

1. A composition comprising $[AB_{x-y}C_y]^{y-}[M]_y^+$, wherein:
   A is silicon,
   B is chlorine,
   C is sulfate, and
   M is lithium or sodium,
   x is 4,
   y is an integer from 1 to 3 inclusive, and
   $[AB_{x-y}C_y]^{y-}[M]_y^+$ is rotationally disordered, ionically conductive, and electrically neutral.

2. The composition of claim 1, in which $M^+$ is mobile.

3. A composition comprising $[AB_{x-y}C_y]^{y-}[M]_y^+$, wherein:
   A is silicon,
   B is a monovalent ligand,
   C is sulfate, and
   M is an alkali metal,
   x is 4,
   y is an integer from 1 to 3 inclusive, and
   $[AB_{x-y}C_y]^{y-}[M]_y^+$ is rotationally disordered, ionically conductive, and electrically neutral.

4. The composition of claim 3, wherein M is lithium or sodium.

5. A mixture comprising the composition of claim 3.

6. The mixture of claim 5, wherein M is lithium or sodium.

7. A composition comprising $[AB_{x-y}C_y]^{y-}[M]_y^+$, wherein:
   A is phosphorus,
   B is chlorine,
   C is sulfate, and
   M is lithium,
   x is 5,
   y is an integer from 1 to 4 inclusive, and
   $[AB_{x-y}C_y]^{y-}[M]_y^+$ is rotationally disordered and ionically conductive, and M is a single, mobile cationic species.

* * * * *